April 14, 1970 C. F. CLIFFORD 3,506,897

TUNING FORK WITH FREQUENCY ADJUSTMENT

Filed June 26, 1967

CECIL FRANK CLIFFORD

Brennan + Brennan

United States Patent Office 3,506,897

Patented Apr. 14, 1970

3,506,897

TUNING FORK WITH FREQUENCY ADJUSTMENT

Cecil Frank Clifford, Newbridge Works, Bath, Somerset, England

Filed June 26, 1967, Ser. No. 648,706
Claims priority, application Great Britain, July 4, 1966, 29,906/66
Int. Cl. G05b 33/00
U.S. Cl. 318—128 1 Claim

ABSTRACT OF THE DISCLOSURE

An electromechanical oscillator including a tuning fork and having a movable magnetic element, either made of a magnetic material or in the form of a permanent magnet, placed adjacent one tine or between the tines, to modify the restoring force and thereby reduce the natural frequency of oscillation, movement of the magnetic element providing a small range of frequency adjustment.

This invention relates generally to electromechanical oscillators, and more particularly to the type of oscillator including a tuning fork which is maintained in oscillation by electrical means.

Tuning forks are widely used in electromechanical oscillators which are employed for a variety of timing purposes, for example, the control of clocks. They must be manufactured to a high degree of precision in order that the frequency of vibration is correct for the required purpose, so that a clock or other timing device which is controlled by the tuning fork will keep accurate time.

It is a great convenience in the manufacture and use of such oscillators if a small range of variation can be provided in the oscillator frequency, so that the frequency may be finally adjusted within this small range in order to set it to the exact frequency at which the oscillator is intended to operate.

In order to provide this facility it is known to construct a fixed magnetic circuit for each tine of the fork in the form of a bar magnet having two magnetic limbs extending at right angles from its ends, the ends of the limbs being close to the respective tine of the tuning fork, which therefore forms a part of the magnetic circuit. It follows that the tuning fork must be made of magnetic material. One limb of the fixed part of the magnetic circuit is surrounded by a coil while the other limb is provided with a regulating nut made of magnetic material which can be screwed to and fro along the limb. Movement of the screw will, of course, alter the total air gap in the magnetic circuit. Both tines are provided with such magnetic circuits, and the two coils are connected respectively in the input and output circuits of an amplifier in the known manner, but only one of the magnetic circuits is provided with the regulating nut.

Since the tine of the fork forms a part of the associated magnetic circuit it is pulled towards the two fixed limbs and this modifies the restoring force acting upon the tine. The effect is to reduce the natural frequency of vibration of the fork, and by adjusting the position of the regulating nut the amount by which the frequency is reduced may be varied. However, a little consideration will show that when the nut is screwed forward towards the tine, thereby reducing the air gap, the main flux in the magnetic circuit is increased and the leakage flux is reduced. The effect of even a small movement of the nut is comparatively large in changing the frequency of vibration of the fork because of the comparatively large change in flux which occurs. The adjustment is therefore a very critical one and great care is required to adjust the frequency correctly.

Moreover, slight inaccuracies in the manufacture of the parts or slight looseness of the nut on the limb have a correspondingly large effect in producing errors or erratic operation.

The principal object of the invention is to provide a frequency regulating arrangement in which the majority of the main flux does not pass through the regulating element so that the adjustment is smooth and positive, and a comparatively large movement of the regulating element is necessary to produce a given change in frequency. Hence, very precise adjustment is possible.

The invention consists of an electromechanical oscillator comprising a tuning fork, a coil associated with each tine of the tuning fork for connection to an amplifier by which the oscillation of the tuning fork is maintained, at least one magnet associated with the tuning fork and coils to establish the main magnetic field associated with each coil and tine by which amplifier input signals are generated and the driving power for the tuning fork is provided, and a movable magnetic element associated with at least one coil and tine which attracts the tine to modify its restoring force and thereby reduce its natural frequency of oscillation, the magnetic element being so placed with respect to the coil and tine that the magnetic flux passing between the magnetic element and the tine is mainly leakage flux and a minimum of the main flux linking with the coil.

The movable member may be made of soft iron or a magnetic alloy having a low loss, and it may consist of a disc which is eccentrically mounted so that rotation of the disc about the eccentric axis produces the desired movement. The disc may be associated with a wheel by which it may readily be rotated by hand and there may be a friction element associated with the disc or the wheel to constrain the disc against rotation out of the adjusted position. Alternatively the movable member may consist of a permanent magnet. The disc or magnet may be so placed as to act upon both tines.

Selected embodiments of the invention will be described by way of example with reference to the accompanying drawings which illustrate the embodiments in diagrammatic form.

In the drawings:

FIGURE 9 illustrates an embodiment in which a movable permanent magnet is arranged to act on both tines of the fork;

In these figures the same reference numbers are used for like elements throughout.

Figures 1, 2, 3, 4, 5, 6, 7, 8, 9, 10, 11:
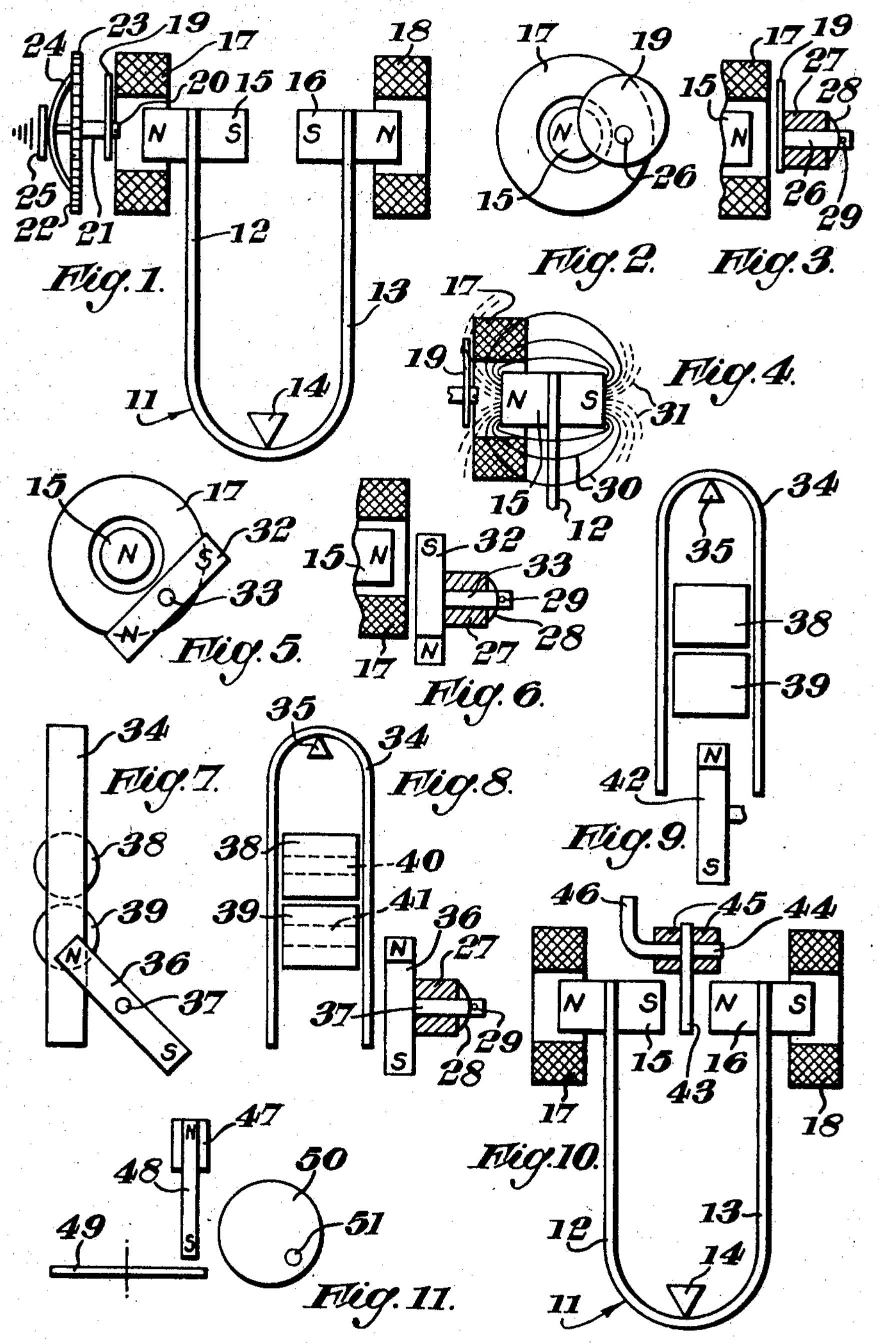
FIGURE 1 illustrates an embodiment of the invention employing an eccentrically mounted magnetic disc.
FIGURES 2 and 3 are further views of the embodiment of FIGURE 1.
FIGURE 4 is a reproduction of a part of FIGURE 1 showing the distribution of the main magnetic field and the leakage field.
FIGURES 5 and 6 illustrate an embodiment employing a movable permanent magnet.
FIGURES 7 and 9 illustrate another embodiment employing a movable permanent magnet.
FIGURE 10 illustrates an embodiment in which a magnetic disc is arranged to act on both tines of the fork.
FIGURE 11 illustrates the aplication of the invention to an arrangement in which a tine of a tuning fork drives an escape wheel having a wavy magnetic track of known kind.

Referring to FIGURE 1, a tuning fork generally indicated by reference 11 has two tines, respectively 12 and 13, and is suported at the centre of the U portion by a supporting member 14. A magnet 15 is mounted on the end of the tine 12 and a magnet 16 is mounted on the end of the tine 13. It will be appreciated that, as a convenience in practical construction, the magnets 15 and 16 may each consist of two small magnets mounted against the opposite faces of the respective tine.

A coil 17 is disposed so that one end of the magnet 15 lies inside the coil and co-operates inductively with it, and a second coil 18 is arranged so that one end of the magnet 16 lies within it to provide inductive co-operation. The coils 17 and 18 are adapted for connection to an amplifier, which may consist of a single transistor, in the well known manner, so that impulses induced in one coil by the oscillation of the associated tine are applied to the amplifier input and amplified impulses appearing at the amplifier output are applied to the other coil, which produces magnetic impulses to maintain the tuning fork in oscillation.

A disc 19 made of soft iron, or a metal alloy having a low loss, or other suitable magnetic material, is mounted by means of a screw 20 and a spindle 21 so as to be rotatable about an axis which is eccentric to the disc itself, the said axis being also displaced from the axis of the magnet 15. The disc 19 is attached by the screw 20 and spindle 21 to a wheel 22 having a knurled or otherwise roughened periphery 23 by which it may easily be rotated by hand. A bowed spring 24 whose ends abut one face of the wheel 22 bears against a pad 25 which is fixed to the framework or suport on which the whole oscillator is mounted so as to provide a friction element.

In FIGURE 1 the axis of the spindle 21 is offset from the axis of the magnet 15 and this is more clearly shown in FIGURES 2 and 3. FIGURE 2 is an end view looking at the disc 19 (the elements 23, 24 and 25 being absent) and indicates the magnet 15, the disc 19 and its spindle. FIGURE 3 also illustrates the magnet 15 and the disc 19. In FIGURES 2 and 3 the disc 19 is shown carried on a spindle 26 supported in a bearing 27, a bowed or dished spring 28 being provided to produce frictional engagement, the spindle 26 and disc 19 being retained in position by means of a pin 29.

FIGURE 4 is a reproduction of a part of FIGURE 1 and applies to the embodiment shown in FIGURES 1, 2 and 3. In FIGURE 4 the main magnetic field of the magnet 15 which links with the coil 17 is shown in solid lines, indicated at 30, and the leakage flux which does not link with the coil 17 is indicated in dotted lines at 31. Assuming that the disc 19 is absent and that the coil 17 is the signal coil which is to be connected to the amplifier input, the oscillation of the tine 12 and magnet 15 modulate the main flux and voltages are induced in the coil 17. The leakage flux at 31 contributes nothing to the production of signal voltages. If, now, the disc 19 is introduced, some of the leakage flux will pass through the disc because a path of lower reluctance is offered and a little of the main flux will be diverted through the disc 19, so that the main flux is slightly reduced by the presence of the regulator disc 19. As the disc 19 is rotated to bring a larger proportion of its area into juxtaposition with the face of the magnet 15 a larger amount of the leakage flux will pass through the disc and a little more of the main flux will be diverted. This slight diversion of the main flux through the coil 17 makes no practical difference to the operation of the oscillator so long as the remaining part of the main flux is adequate to produce signals of sufficient amplitude to turn a small transistor on. Since the amount of the main flux which is diverted is small it is a simple matter so to design the magnet and coil as to provide an initial surplus of signal amplitude so that with the disc 19 in the "maximum" position the signal amplitude is still adequate.

When the disc 19 is introduced a small amount of the magnetic flux passes directly between the magnet 15 and the disc, so that a pull is exerted on the magnet and the associated tine of the fork. This modifies the restoring force in the tine and hence reduces its natural frequency of oscillation to slightly below what it would be in the absence of the disc 19. As this disc is rotated to increase the area thereof which faces the magnet 15 the oscillation frequency is further reduced and this provides the range of regulation. Only a very small part of the total field of the magnet 15 passes through the disc 19 and the shape and thickness of the disc 19 and its distance from the magnet 15 and coil 17 may be so selected as to provide an adjustment of great delicacy and high precision.

While a soft iron or equivalent disc 19 has been described and shown in FIGURES 1 to 4 the same effect may be produced by the use of a small permanent magnet as illustrated in FIGURE 5 and FIGURE 6, which is a side view of the arrangement of FIGURE 5. The tine of the fork is not shown but the figures show the end of the magnet 15 and the coil 17, and a permanent magnet 32 arranged to rotate with a spindle 33. It will be evident that if the magnet 32 is rotated to bring its south pole adjacent the north pole of the magnet 15 the magnet 32 will exercise a pull on the magnet 15 and thereby modify the centralizing force inherent in the tine 12. On the other hand, if the magnet 32 is rotated so as to bring its north end adjacent the magnet 15 the two magnets will repel and the tine 12 will be pushed inwardly thereby also modifying the centralizing force. In either case the frequency of the fork 11 will be reduced below that at which it would oscillate in the absence of the magnet 32. FIGURE 6 shows the magnet 15, the magnet 30 and its spindle 33, a bearing 27, spring 28 and retaining pin 29 similar to the parts illustrated in FIGURE 3.

Tuning forks or other oscillating members may themselves be permanent magnets but certain materials which are especially suitable for use in tuning forks cannot be used as permanent magnets and separate magnets must be employed. These may be mounted on the tines of the fork, as illustrated in FIGURES 1, 2 and 3, but there may be cases in which a fixed magnet is provided and the fork is either only slightly magnetic or is magnetic but does not form a permanent magnet, its action being then that of an inductor. In such a case a soft iron or equivalent disc, as illustrated in FIGURES 1, 2 and 3, would not be effective and it is essential to use a permanent magnet as illustrated in FIGURES 7 and 8. Here the tuning fork 34 is carried on a support 35 and a small bar magnet 36 rotatable with a spindle 37 is carried in a bearing 27 and held in position by a dished spring 28 retained by a pin 29. It will be evident that in this case either pole of the magnet 36 will produce the same effect by influencing the adjacent time of the fork, thereby modifying the centralizing control force inherent in the tine of the fork. Two coils 38 and 39 are placed between the tines of the fork. Each coil has a permanent magnet inside it, respectively 40 and 41 shown dotted, the magnets being placed so that each tine is adjacent the south pole of one magnet and the north pole of the other.

In the embodiments described so far the added magnetic frequency regulating member acts upon one tine of the fork, and its effect is to modify the restoring force in that tine so that the fork oscillates at a lower frequency. If the fork, as initially made, has tines which naturally oscillate at precisely the same frequency, the effect of adding the magnetic member is that the two tines tend to oscillate at different frequencies. In practice the two tines oscillate at the mean of the two frequencies and one tine has a slight but constant phase lag behind the other. This mode of operation is quite satisfactory if the range of frequency adjustment required is not more than about 1 part in 1,000 of the fork frequency, but where a greater range is required it is desirable that the restoring force of both tines should be similarly modified. The invention provides for this mode of operation and one form is illustrated in FIGURE 9 which shows an arrangement similar to that of FIGURES 7 and 8 except that the magnet is disposed centrally between the two tines of the fork 34. The fork 34, support 35, coils 38 and 39 with magnets 40 and 41 (not shown) and the bearing arrangement (not shown) may be identical with those of FIGURES 7 and 8.

FIGURE 10 shows how the frequency regulating means may be made to act on both tines of the fork in the arrangement of FIGURE 1. As in FIGURE 1 the fork 11 is carried on the support 14 and has magnets respectively 15 and 16 mounted on its two tines 12 and 13 and coils 17 and 18 are provided. Between the magnets 15 and 16 is a disc 43 made of a magnetic metal such as soft iron or an alloy or other magnetic material. The disc 43 is carried eccentrically on a spindle 44 supported in bearings 45, the spindle 44 being extended and cranked at 46 so that by moving the cranked portion 46 the disc 43 is rotated. The effect, as in the other embodiments described, is to reduce the fork frequency by modifying the centralizing force and in this case it acts equally on both tines of the fork.

Where a tuning fork is required to drive an escape wheel having a wavy magnetic track around one face, as described for example in my co-pending patent application Ser. No. 643,933, filed June 6, 1967, an arrangement such as that illustrated in FIGURE 11 may be adopted. In this case the tine 47 of the fork has a magnetic bar 48 (which may be a permanent magnet) attached to it and the bar 48 co-operates with the wavy magnetic track (not shown) on an escape wheel 49. A disc 50 made of soft iron or a low loss magnetic alloy is mounted on a spindle 51 and is arranged adjacent the magnetic bar 48. Its effect is as before, that is, to modify the centralizing force which is inherent in the tine 47 of the fork and thereby reduce the natural frequency of oscillation of the fork.

In the manufacture of tuning forks, as in the manufacture of other devices, manufacturing tolerances must be set. In the normal manner the tolerance allowance would be slightly above and slightly below the dimensions, or parameters, at which the fork would oscillate at the desired natural frequency. By arranging the manufacturing tolerances so that they are all in one direction it is easy to ensure that all the forks manufactured are slightly "fast." Then, by adding an adjustment device as described herein the natural frequency of the fork may be reduced to a small extent until it oscillates at the desired frequency.

I claim:

1. An electromechanical oscillator comprising a tuning fork, a coil associated with each tine of the tuning fork for connection to an amplifier by which the oscillation of the tuning fork is maintained, at least one magnet associated with the tuning fork and coils to establish the main magnetic field associated with each coil and tine by which amplifier input signals are generated and the driving power for the tuning fork is provided, and a magnetic disc made of soft iron or other magnetic material, the disc being rotatable about an axis eccentric to the disc axis and being associated with at least one coil and tine so as to attract the tine to modify its restoring force and thereby reduce its natural frequency of oscillation, the disc being so placed with respect to the coil and tine that the magnetic flux passing between the disc and the tine is mainly leakage flux and a minimum of the main flux linking with the coil.

References Cited

UNITED STATES PATENTS

| | | | |
|---|---|---|---|
| 2,628,343 | 2/1953 | Murray. | |
| 2,928,308 | 3/1960 | Godbey | 84—409 |
| 3,091,151 | 5/1963 | Cunningham | 331—156 X |
| 3,208,287 | 9/1965 | Ishikawa et al. | 74—1.5 |
| 3,277,644 | 10/1966 | Nomura et al. | 58—23 |
| 3,338,047 | 8/1967 | Kueffer | 58—23 |

MILTON O. HIRSHFIELD, Primary Examiner

D. F. DUGGAN, Assistant Examiner

U.S. Cl. X.R.

58—23; 310—22, 25; 331—156